No. 607,300. Patented July 12, 1898.
J. TRISLER.
GATE.
(Application filed Aug. 26, 1897.)
(No Model.)
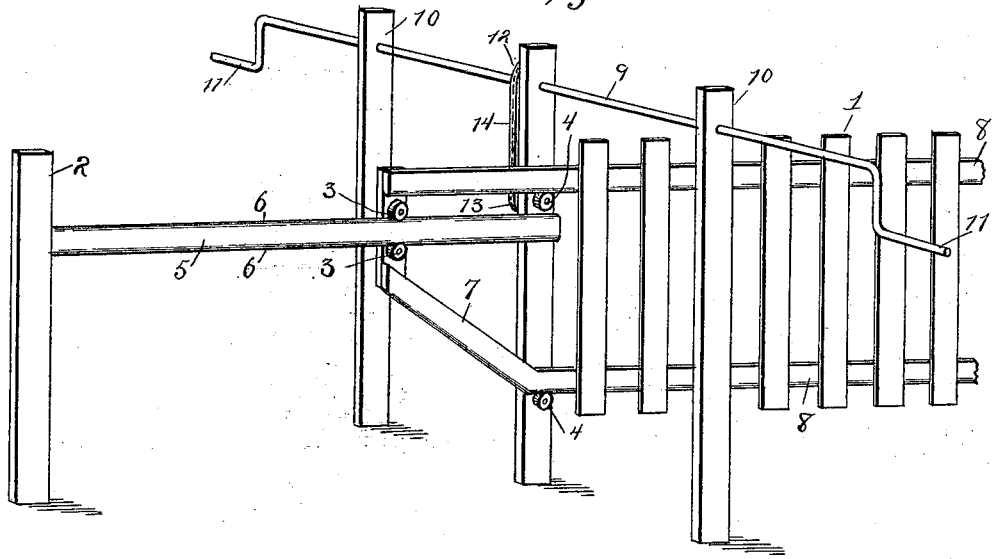
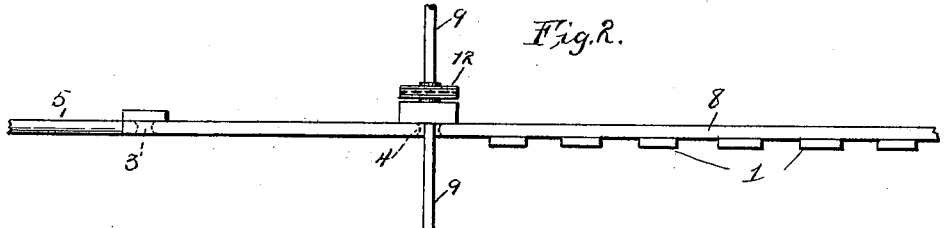
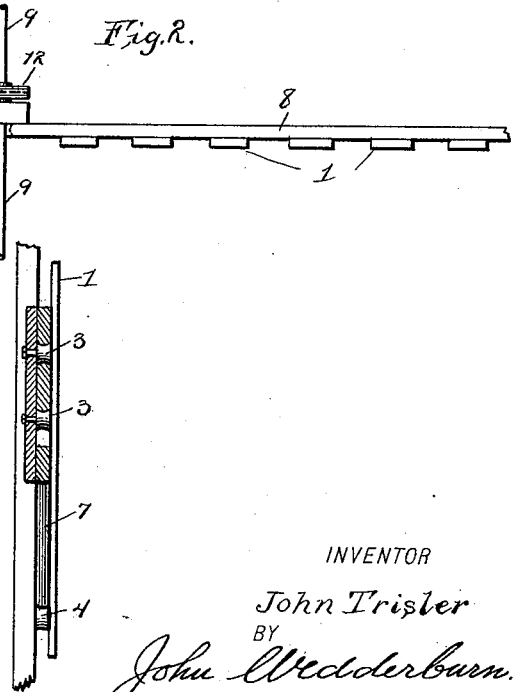
WITNESSES:
INVENTOR
John Trisler
BY
John Wedderburn.
ATTORNEY.

UNITED STATES PATENT OFFICE.

JOHN TRISLER, OF JAMAICA, ILLINOIS.

GATE.

SPECIFICATION forming part of Letters Patent No. 607,300, dated July 12, 1898.

Application filed August 26, 1897. Serial No. 649,640. (No model.)

*To all whom it may concern:*

Be it known that I, JOHN TRISLER, a citizen of the United States, residing at Jamaica, in the county of Vermilion and State of Illinois, have invented certain new and useful Improvements in Gates; and I do hereby declare the following to be a full, clear, and exact description of the invention, such as will enable others skilled in the art to which it appertains to make and use the same.

This invention relates to improvements in gates, and has more particular relation to sliding gates.

The invention consists in certain features of construction and combination of parts, which will be hereinafter fully described and claimed.

In the accompanying drawings, forming part of this specification, Figure 1 represents a perspective view of a gate embodying my invention. Fig. 2 represents a top plan view of the same, and Fig. 3 represents a vertical section through the gate and fence on the line of the antifriction-rollers carried by the gate.

1 in the drawings represents the gate; 2, the fence proper; 3 3, the antifriction-rollers mounted on the gate, and 4 4 the antifriction-rollers mounted on the fence.

The fence 2 is of any ordinary construction, with the exception that it is provided with a horizontal beam 5, having convex upper and lower edges 6, which are preferably bound with similarly-shaped metallic strips. Said beam 5 is adapted to form a firm support for the antifriction-rollers 3, which are grooved upon their peripheries, so as to fit snugly over the upper and lower edges of said beam. Said rollers 3 are mounted upon an extension 7 of the gate 1, which latter is of any desired construction, with the exception that it is provided near its upper and lower ends with horizontal beams or rods 8, which are adapted to rest upon the antifriction-rollers 4, mounted upon one of the posts of the fence and formed with grooved peripheries similar to the rollers 3. The under side of each of the beams 8 is formed convex and bound with metal in a similar manner to the beam 5, so that the wheels or rollers 4 will become firmly seated thereon.

In order to open the gate from either one side or the other at some distance from the same, I provide a shaft 9 of the desired length and mounted in suitable standards 10, arranged beside the road. This shaft is provided at each end with an operating handle or lever 11, whereby it may be rotated by the occupants of the vehicle. The central portion of said shaft 9 is provided with a sprocket-wheel 12, which is connected to a similar sprocket-wheel 13 by a sprocket-chain 14. Said wheel 13 is made fast to the uppermost roller 4, whereby the latter is rotated, thus causing the gate to open or close, according to the direction of its rotation.

It will be observed from the foregoing description that the occupants of the vehicle approaching from either direction may readily open the gate by simply operating either one or the other of the handles 11 without alighting from the vehicle. They may also as readily close the gate after they have passed by operating the opposite handle in a reverse direction. This opening and closing of the gate can be accomplished with very little effort, as the peculiar construction of the gate and the antifriction-rollers for supporting the same reduce the friction to a minimum and permit of the gate being opened or shut with the expenditure of very little force.

Having thus described my invention, what I claim as new, and desire to secure by Letters Patent, is—

In a sliding gate, the combination with a fence proper having a horizontal beam, of a gate, antifriction-rollers mounted upon the gate and in engagement with the horizontal beam of the fence, antifriction-rollers mounted upon the fence and adapted to engage the gate, gearing for operating one of the last-mentioned antifriction-rollers for opening and closing the gate, and a rotatable shaft for operating said gearing, substantially as described.

In testimony whereof I have signed this specification in the presence of two subscribing witnesses.

JOHN TRISLER.

Witnesses:
H. H. CUMMING,
E. P. DAVIS.